United States Patent [19]

Overton et al.

[11] Patent Number: 4,530,372

[45] Date of Patent: Jul. 23, 1985

[54] LIQUID LEVEL CONTROLLER

[75] Inventors: Raymond C. Overton; Charles F. Cole, both of Ponca City, Okla.

[73] Assignee: Conoco Inc., Ponca City, Okla.

[21] Appl. No.: 416,207

[22] Filed: Sep. 9, 1982

[51] Int. Cl.³ .......................................... G01F 23/26
[52] U.S. Cl. .................... 137/392; 73/304 C; 307/118; 361/178
[58] Field of Search ......... 137/392; 73/290 R, 304 C; 307/118; 340/620; 361/178; 222/52, 64

[56] References Cited

U.S. PATENT DOCUMENTS

| | | | |
|---|---|---|---|
| 2,871,874 | 3/1959 | Coles et al. | 137/392 |
| 3,197,884 | 8/1965 | Smith | 361/178 |
| 3,391,547 | 7/1968 | Kingston | 73/304 C |
| 3,408,941 | 11/1968 | Sorensen | 137/392 |
| 3,486,037 | 12/1969 | Romano | 307/118 |
| 3,520,638 | 7/1970 | McUmber et al. | 137/392 |
| 3,545,482 | 12/1970 | Paull | 137/392 |
| 3,670,765 | 6/1972 | Haynes | 137/392 |
| 3,848,627 | 11/1974 | Page | 137/392 |
| 3,916,213 | 10/1975 | Luteran | 137/392 |
| 3,922,564 | 11/1975 | Kachuk et al. | 137/392 |
| 4,002,996 | 1/1977 | Klebanoff et al. | 73/304 C |
| 4,061,442 | 12/1977 | Clark et al. | 137/392 |
| 4,065,227 | 12/1977 | Rose | 137/392 |
| 4,165,641 | 8/1979 | Pomerantz et al. | 73/304 C |
| 4,199,984 | 4/1980 | Huddart et al. | 73/304 C |
| 4,382,382 | 5/1983 | Wang | 340/620 |
| 4,444,051 | 4/1984 | Yamaki et al. | 73/304 C |

*Primary Examiner*—George L. Walton
*Attorney, Agent, or Firm*—William J. Miller

[57] ABSTRACT

A level control apparatus is disclosed for controlling a liquid level between a maximum and a minimum. An elastic circuit generates a reference pulse which receives the pulse and triggers the generation of first and second reference pulses. The first reference pulse has a width which corresponds to the function of the maximum level of liquid and the second reference pulse has a width which corresponds to the function of the minimum of liquid. A capacitance probe supplies an output to a level sensing means which generates an output control pulse which varies in time with respect to the liquid level. A response circuit receives the first and second reference pulses and the control pulse and generates a first response when the reference pulse and the control pulse occur at a time which indicates that the fluid is at the maximum level and a second response signals when the second response indicates that the fluid has dropped to a minimum level with a time provided between the minimum and maximum where no response is developed.

5 Claims, 3 Drawing Figures

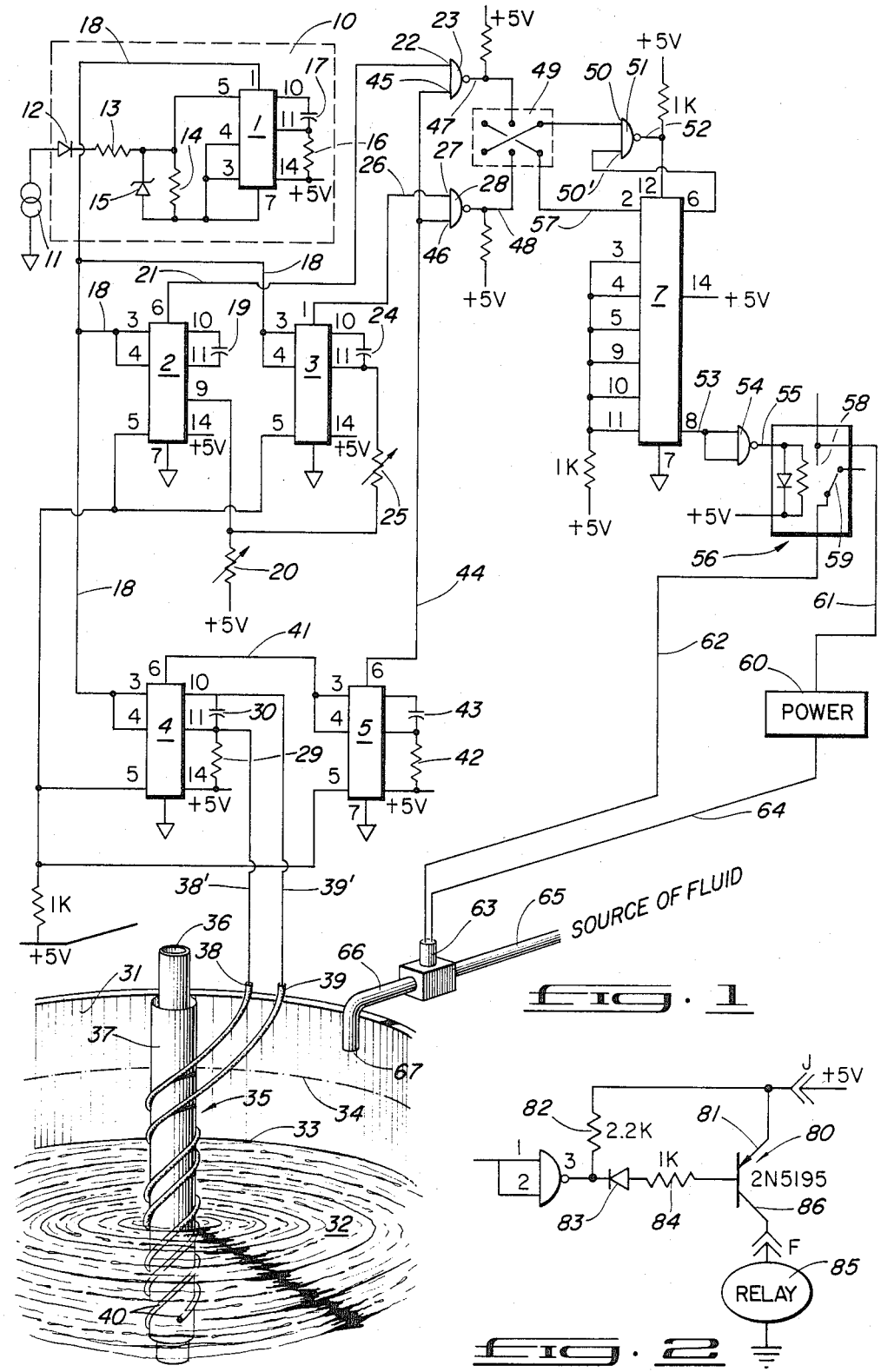

LIQUID LEVEL CONTROLLER

BRIEF DESCRIPTION OF THE PRIOR ART

The most pertinent prior art is U.S. Pat. No. 2,871,874 to R. V. Coles. This patent uses the capacitance change of a liquid level, however, the control circuit uses a radio frequency oscillator in which a capacitance inductance bridge utilizes the probe capacitance change and a hold-in capacitance as part of a bridge. The bridge is part of the oscillator feedback circuit. The capacitance change starts and stops the oscillator which in turn operates a relay; therefore, this circuit operates completely different from the circuit of the invention which operates by pulses which represent the desired maximum and minimum liquid level and a further pulse which represents the current liquid level. A comparison of the three pulses in a special circuit determines the response of the output circuit.

BRIEF DESCRIPTION OF THE INVENTION

This invention comprises an apparatus for controlling a liquid level between a predetermined maximum and a predetermined minimum in a container. A clock pulse generates an output timing pulse which is used to synchronize all of the subsequent circuits. The first reference pulse has a width which corresponds to a function of the maximum level of the liquid. The second reference pulse has a width which corresponds to a function of the minimum level of the liquid. A level sensing circuit receives the timing pulse and a signal from a capacitance probe and generates an output control pulse with a variation in time with respect to the liquid level. A response circuit receives the first and second reference pulses and the output control pulse and generates a first response signal when the first reference pulse and the control pulse occur at a time which indicates that the fluid is at the maximum predetermined level and a second response signal when the second reference pulse and the control pulse occur at a time indicating that the fluid level has dropped to the predetermined minimum level. A circuit is provided which is responsive to the first and second response signals to stop the flow of liquid when the predetermined maximum level has been reached and begins the flow of fluid when the predetermined minimum level has been reached.

The invention also discloses a unique probe for determining capacity which includes an insulated cylinder with a pair of conductors wrapped around the cylinder. The conductors are insulated from each other and insulated at the end where the conductors terminate. In place of a single conductor, pairs of conductors can be used.

BRIEF DESCRIPTION OF THE FIGURES

FIG. 1 is a circuit diagram of the invention illustrating its use as a liquid level monitor;

FIG. 2 is an alternate relay system to that disclosed in FIG. 1; and

DETAILED DESCRIPTION OF THE INVENTION

Figure 3:
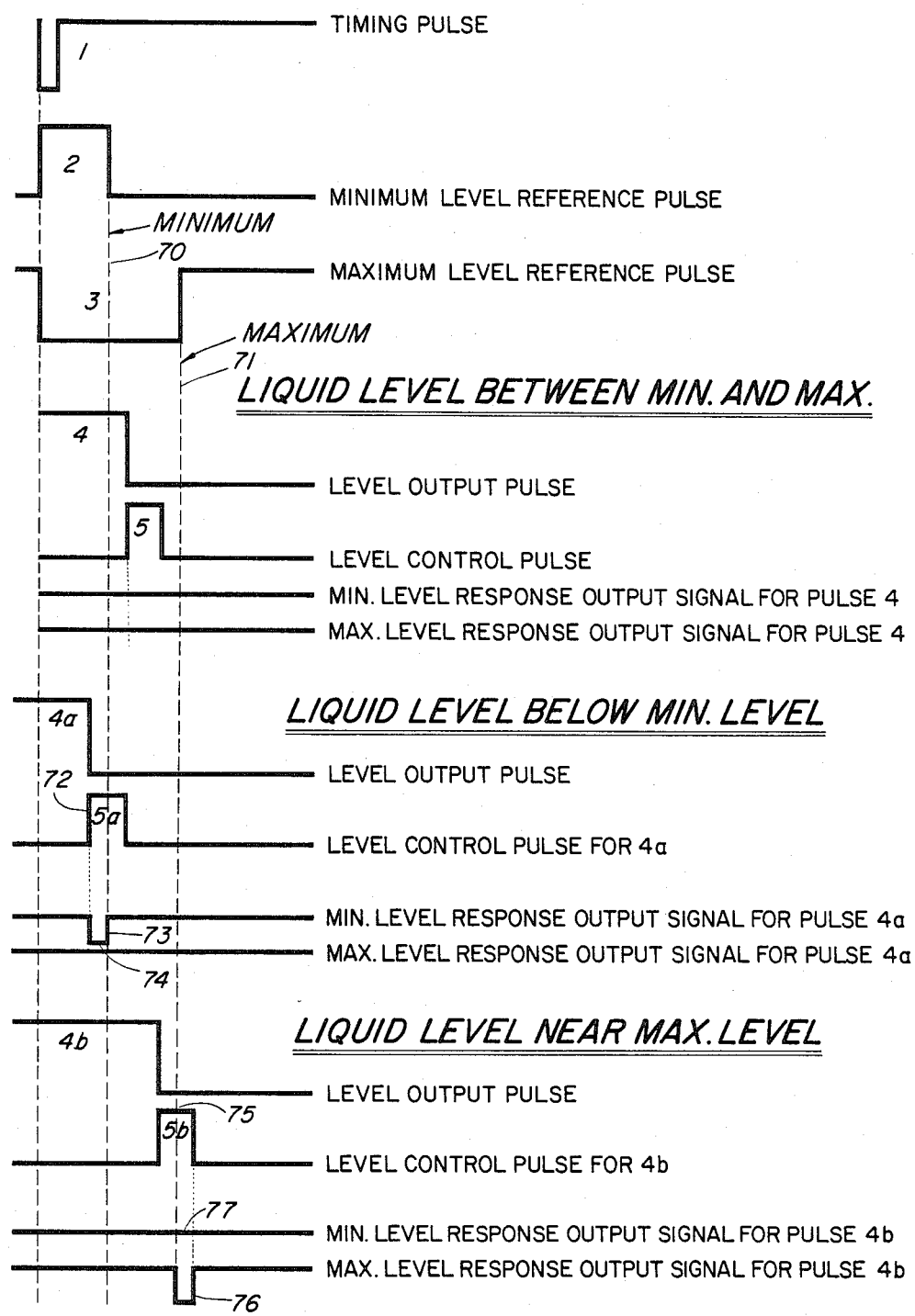
FIG. 3 is a pulse diagram illustrating the position of the reference pulses and the control pulse for various fluid levels.

Referring to all of the figures but in particular to FIG. 1, a detailed circuit of the invention and its preferred use are disclosed. A clock means 10 has an input from an a.c. source 11 through a diode 12 and a voltage divider comprising resistors 13 and 14 to pin 5 to integrated circuit (i.c.) 1. i.c. 1 is a monostable multivibrator and is designated as 74121 monostable. Such monostables are well known in the art and will not be described in detail. Diode 15 provides protection to the input of monostable multivibrator 15 so that the input voltage will not exceed a predetermined voltage, thereby damaging the multivibrator. Resistor 16 and capacitor 17 provide the time constant for the monostable multivibrator. The output from pin 1 is provided on wire 18 to pins 3 and 4 of i.c. units 2, 3, 4, and 5. Output along wire 18 provides synchronism to each of the wire circuits. A reference pulse representing a function of the minimum level of the fluid is generated from i.c. unit 2. A reference pulse from i.c. unit 3 represents a function of the maximum predetermined level of the fluid desired in the container. The timing of reference pulses from i.c. units 2 and 3 (hereafter called pulse 2 and pulse 3) are generated in the following manner:

The width of pulse 2 is determined by capacitance 19 and resistance 20 and can be adjusted to various pulse widths so that the pulse width will adequately be a function of the predetermined minimum liquid level desired. Thus, once capacitance 19 is determined, the actual level would be set by resistor 20. Output from reference circuit 2 is provided along wire 21 to an input 22 of a nand gate 23. i.c. unit 3, as previously mentioned, is synchronized by clock circuit 10 through wire 18 to inputs 3 and 4. The pulse width is adjusted by capacitance 24 and adjustable resistors 25 and 20. Thus, any change in resistor 20 will automatically act on resistor 25. The output from i.c. unit 3 is supplied through pin 1 along wire 26 to input 27 of nand gate 28. The control pulse is generated in two circuit i.c. units 4 and 5. i.c. unit 4 is, as previously mentioned, from clock means 10 through wire 18 to inputs 3 and 4. The pulse width or the fall time of the pulse is determined by several factors. First, the combination of resistor 29 and capacitor 30 basically determines the maximum pulse width which will place the control pulse so that it will function as a control for the liquid level.

As will be subsequently described, the control pulse must occur between the minimum and maximum fall times of pulses 2 and 3 when the liquid level is between the minimum and maximum predetermined levels.

A tank, for example 31, has a liquid 32 therein which may have a minimum level 33 and a maximum desired level 34. A capacitance probe referred to by arrow 35 is the apparatus which measures the variation in liquid level. Capacitance probe 35 includes a tube 36 which may be metal with an insulated outer covering 37. It is obvious that the probe can be an insulated cylinder. The preferred tube is made of stainless steel covered with an insulation material. First and second conductors 38 and 39 are wrapped around the insulated probe 37. Conductors 38 and 39 must be insulated and open ended. The insulation is preferably heavy enamel coating. Ends 40 of conductors 38 and 39 must also be insulated. In the particular embodiment, a single conductor 38 and 39 is illustrated, however, several conductors can be used. For example, a second insulated conductor electrically connected to 38 can be wrapped on the other side of insulated conductor 39, thereby increasing the total capacitance of the probe. Conductors 38 and 39 are connected through conductors 38' and 39', respectively, to pins 11 and 10 of i.c. unit 4 which is also in parallel with capacitor 30. It is obvious then that any change in the capacitance of the probe will function as a total change in capacitance of pins 10 and 11, causing a change in the pulse width or fall time of the control pulse generated by i.c. unit 4. This pulse will hereafter be referred to as pulse 4. Pulse 4 is transmitted through wire 41 from pin 6 to i.c. unit 4 to the input pins 3 and 4 of i.c. unit 5. The fall time of pulse 4 triggers i.c. unit 5. The pulse width of i.c. unit 5 is determined by resistor 42 and capacitor 43. The pulse generated, hereafter referred to as pulse 5, will occur in time with the fall time of pulse 4. The output from i.c. unit 5 leaves pin 6 on wire 44 and is applied to the input 45 of nand gate 23 and input 46 of nand gate 28. The output from nand gates 23 and 28 occurs on wires 47 and 48, respectively, and passes through a reversing switch 49 to the input 50 of nand gate 51. The output from nand gate 51 is applied through a wire 52 to pin 12 of i.c. unit 7. The input to pin 12 of i.c. unit 7 toggles i.c. unit 7 and supplies an output on pin 8 through wire 53 to nand gate 54. The output from nand gate 54 on wire 55 is applied to a relay generally referred to as 56. Reset for i.c. 7 is applied through wire 57. The output from relay 56 through contacts 58 and 59 causes the circuit from power source 60 through wires 61 and 62 to a relay operated valve 63. The circuit returns to wire 64 to the power source. A pipe 65 supplies fluid to valve 63 and pipe 66 empties into outlet 67 into tank 31. An output from pin 6 on i.c. unit 7 is applied to the remaining input 50'.

OPERATION

Referring to FIGS. 1 and 3 the operation of the circuit will be described.

i.c. circuit 1 generates an output pulse on wire 18 which is synchronized to the 60 cycle alternating current source 11 which is inputted through diode 12 and dividers 13 and 14 to unit 5. As previously discussed, i.c. unit 1 is a multivibrator which is triggered by the input a.c. source 11 which is converted to pulsating d.c. through diode 12. The output pulse along wire 18 is used to synchronize each of the subsequent pulse generating circuits in i.c. units 2, 3, and 4. i.c. units 2 and 3 generate reference pulses 2 and 3 which correspond to the function of the minimum or maximum fluid level respectively. Capacitor 19 and adjustable resistor 20 are setting the pulse width or determine the fall time of pulse 2. Capacitance 24 and adjustable resistors 25 and 20 will determine the pulse width or the fall time of pulse 3.

Referring to FIG. 3 it can be noted that the fall time of pulse 2 denoted by dotted line 70 and the fall time of pulse 3 denoted by dotted line 71 have a space between them. This time is referred to as the dead time, that is, the time when no response will occur in the circuit. A response will only occur below or above time 70 or 71. The adjustment of resistors 20 and 25 provides variation in the occurrence of fall times 70 and 71. These pulses 2 and 3 are applied to one of the inputs 22 and 27, respectively, of nand gates 23 and 28. The pulse which represents the actual liquid level and controls all of the subsequent circuit functions is generated by i.c. units 4 and 5. i.c. unit 4 is synchronized by the clock means 10 through wire 18 and generates a pulse that has a fall time determined by capacitance 30 and the capacitance of probe 35. The fall time of pulse 4 will be supplied along wire 41 to the inputs 3 and 4 of i.c. unit 5. i.c. unit 5 will be triggered by the fall time of pulse 4 and will cause a pulse to be generated. The width is determined by resistor 42 and capacitor 43. The polarity of pulse 3 is the reverse of that of pulse 2 and pulse 5 has a polarity which is the same as that of pulse 2. The polarity of the pulses will determine the function of the subsequent operation of the nand gates 23 and 28. Capacitance 30 and resistor 29 are adjusted so that, when the fluid 32 in tank 31 is intermediate to the minimum level 33 and the maximum level 34 that the capacitance as applied from probe 35 when combined with the capacitance 30 will place the pulse between time 70 and time 71. When an adjustment will need to be made for a change of probe 35 if probe 35 differs in capacity from a previous probe or orientation of wires, etc, resistor 29 can be easily adjusted to provide the proper fall time for pulse 4'. Once the fall time is properly selected and the probe is positioned in fluid 32, a variation in the fluid level will cause a variation in the capacitance probe 35. This variation in capacitance is reflected as a change in capacitance across a parallel capacitor 30. A change in the capacity of parallel capacitor 30 will cause a change in the fall time of pulse 4.

The circuit is designed so that when the fluid is at a minimum at level 33, for example, the fall time of pulse 4 will occur along time 70. When the level is at its maximum 34, the fall time will occur along line 71. This fall time will then generate the varying pulse 5. Pulse 5 is then applied through wire 44 to nand gate inputs 45 and 46 of nand gates 23 and 28, respectively. It can be seen, viewing FIG. 3, that, when the liquid level is between the minimum and maximum, pulse 5 will lie between time 70 and time 71. In order for the nand gate to function, a positive pulse must appear on both inputs 22 and 45 or 27 and 46 simultaneously. When this occurs, the gate will drop from its positive state to zero.

Referring to FIG. 3 it can be seen that, when pulse 5 is between time 70 and time 71 that a positive pulse does not appear at the inputs 22 and 45 or 27 and 46. Thus neither nand gate 23 or 28 will change its state; however, as shown in FIG. 3, when the liquid level drops below or at minimum level, pulse 5 will move so that a portion 72 of pulse 5 overlaps time 70. Since two positive pulses will occur at inputs 22 and 45, nand gate 23 will change its state and develop a pulse 73 as illustrated. It should be noted, however, that nand gate 28 as illustrated at time 74 developes no pulse since the input to gate 46 is not positive. When the liquid level is near minimum level, pulse 5 will have a portion 75 overlapping time 71. This will synchronize with a positive going fall time of pulse 3 causing output 76 on nand gate 28 and zero pulse 77 on nand gate 23.

Since i.c. circuit 7 is at a low state at pin 12 a low state is applied to pin 50' of nand gate 51. Thus when pulse 5 and pulse 2 cause a high at both inputs 22 and 45 to nand gate 23, output on wire 47 changes from high to low applying a low to input 50 of nand gate 51. With both inputs low, gate 51 will change from high to low causing a low at pin 12 of i.c. circuit 7 causing it to toggle. An output circuit will then pass from pin 8 through relay 56 causing contacts 58 and 59 to close. Power from unit 60 will then be applied through wire 61 and 62 to relay controlled valve 63 and through wire 64 causing relay 63 to open passing water, for example, through pipes 65, 66 to outlet 67 and filling tank 31.

When i.c. circuit 7 changes to a low state at pin 8, pin 6 goes to a high state applying the high state to pin 50' of nand gate 51, thereby cutting off the gate 51 from further triggering usually caused by waves or ripples in the water caused by fluid from pipe 66, for example.

As the level raises, pulse 5 will move from time 70 to a location between 70 and 71 between the minimum and maximum levels. When pulse 5 passes between time 70 and 71, nand gate 23 will return to high, nand gate 31 will then also return to high but i.c. 7 will remain toggled until a reset pulse is received on pin 2. When pulse 5 passes time 71 liquid level has reached or is near maximum level. At this time position a positive going signal will be applied to both inputs 27 and 46 of nand gate 28 causing a low potential at its output which is communicated through wire 48 and 57 to reset pin 2. Circuit 7 will then reset opening contacts 58 and 59 and closing relay control valve 63.

A reversing switch 49 is included to provide an easy means for changing the response of circuit 7 so that the circuit will cause flow either at maximum level or at minimum level as desired by user. It is obvious, of course, that the relay contact can be changed to make the circuit normally closed or normally open as illustrated.

In FIG. 2 an alternate relay is illustrated wherein a transition 80 is substituted for the constant circuit. Emitter 81 is connected to a source of power and to the base through a resistor 81, diode 83 and resistor 84. Relay 85 is coupled through collector 86 to ground. The circuit of FIG. 2 provides more reliability than the configuration illustrated in FIG. 1.

It is obvious that changes can be made in the application and still be within the spirit and scope of the invention as disclosed in the specification and appended claims.

What is claimed is:

1. Apparatus for controlling a liquid level between a maximum and a minimum in a container means comprising:
   (a) clock means generating an output timing pulse;
   (b) reference pulse means receiving said timing pulse and triggering the generation of first and second reference pulses, said first reference pulse having a width corresponding to a function of the maximum level of said liquid and said second reference pulse having a width corresponding to a function of the minimum level of said liquid;
   (c) capacitive probe means disposed in said container means in contact with liquid level between a maximum and a minimum to provide a proportional capacitive signal output;
   (d) level sensing means triggered by said timing pulse to produce and output control pulse, and receiving said capacitive signal output to vary said control pulse width proportional to said liquid level;
   (e) first and second gate means each receiving respective first and second output pulses as well as respective control pulse inputs and generating a first response signal when said first reference pulse and said control pulse occur at a time indicating that said fluid is at said maximum level, and a second response signal when said second reference pulse and said control pulse occur at a time indicating that said fluid level has dropped to said minimum level;
   (f) means energizible to stop and to begin flow of fluid to said container means; and
   (g) means responsive to first and second response signals to control said means energizible to stop the flow of liquid when said maximum level has been reached and begin the flow of fluid when said minimum level has been reached.

2. Apparatus as described in claim 1 wherein said reference pulse means comprises a second circuit means which generates said second pulse, the period of which is determined by an adjustable resistance means, and first circuit means which generates said first reference pulse having a period which is determined by a second resistance means and said first resistance means, whereby the spacing between the fall time of said second pulse and the fall time of said first pulse comprises a dead band, said dead band providing a fluid level change which will not cause additional fluids to flow into said container.

3. Apparatus as described in claim 1 wherein said level sensing means comprises a first circuit that generates an output pulse which is initiated by said timing pulse and has a width determined by said liquid level capacitive signal, and a second circuit which receives said output pulse for said level sensing means and generates said control pulse.

4. Apparatus as described in claim 1, 2 or 3 wherein said capacitive probe means comprises an elongated cylinder having insulation means along its outer surface, first and second conductors wrapped around said circumference of said cylinder means and along its length, said first and second conductor means being each insulated along its length and at the end adapted to be inserted in said liquid, and means for coupling said conductors to said level sensing means.

5. Apparatus as described in claim 1, 2 or 3 wherein said capacitive probe means comprises an elongated cylinder having insulation means along its outer surface, first and second conductors wrapped around said circumference of said cylinder means and along its length, said first and second conductor means being each insulated along its length and at the end adapted to be inserted in said liquid, and means for coupling said conductors to said level sensing means, and probe means wherein at least one of said conductor means comprises first and second insulated conductors spaced on each side of said second conductor means.

* * * * *